July 26, 1927.
H. O. BREE
1,637,292
METHOD OF STARTING INDUCTION MOTORS AND APPARATUS THEREFOR
Filed July 15, 1926
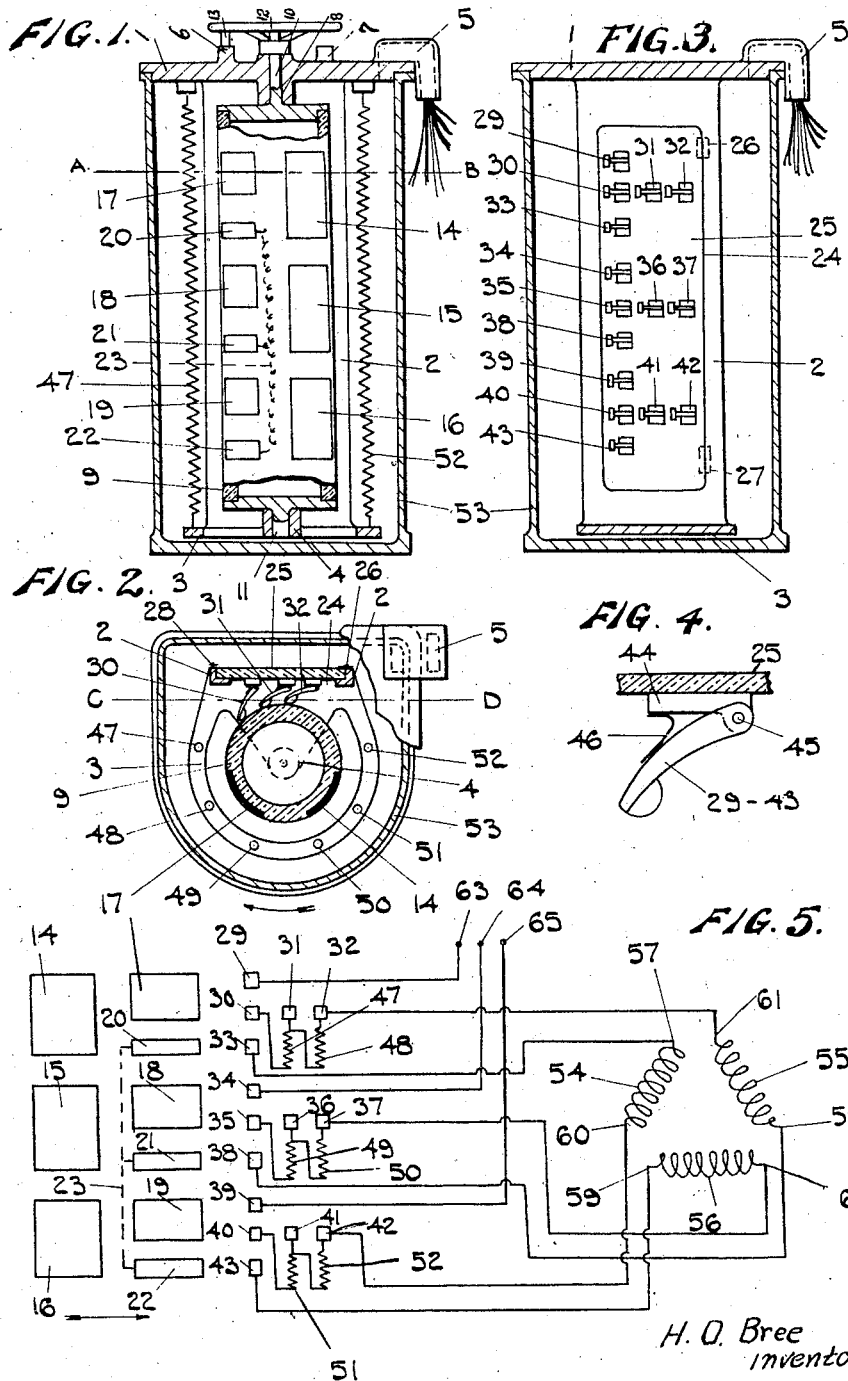
H. O. Bree
inventor
By Marks & Clark
Attys Patented July 26, 1927.

1,637,292

UNITED STATES PATENT OFFICE.

HELIER OSWALD BREE, OF AUCKLAND, NEW ZEALAND.

METHOD OF STARTING INDUCTION MOTORS AND APPARATUS THEREFOR.

Application filed July 15, 1926, Serial No. 122,655, and in New Zealand August 19, 1925.

This invention relates to starting methods and apparatus for three phase A. C. induction motors and while especially applicable to the squirrel cage type of such motors may also be utilized with obvious adaptations for other three phase A. C. motors.

The objects aimed at by this invention are to provide an improved power factor over the whole starting period with consequential less use of current for same starting torque—to lessen the starting current at both star and delta positions compared with present star-delta switches and to allow of starting against greater load than same,—to lessen the manufacturing cost as compared with that necessitated by auto transformer starters, to enable resistances to be shaped and placed so as to allow of starter dimensions being less than equal in size to other types, to facilitate repairs, and to enable easy adaptation of the starter to starting conditions by the insertion of suitable resistances as required. Other objects are hereinafter referred to.

My method makes use of the advantages of each of the two known starting methods namely (1) star to delta switching which method is to connect the motor windings in star at starting and in delta at running, (2) stator resistance method in which resistances are included in series with each phase of the supply and are gradually short circuited.

The starting described takes advantage of (1) the reduction of pressure to the motor winding and proportionate increase of current by star starting position (2) the use of resistances in each phase or only two phases of the supply which may be cut out by one or more steps. The use of resistance reduces the starting current to allowable values and also, which is important, improves the power factor at starting thereby increasing the starting torque for a given current. Thus a squirrel cage motor will have a greater starting torque when certain resistances are in series with the supply, than when it is directly connected to the mains notwithstanding that the starting current is less. Further all or some of the resistances may be inserted in the delta position, finally being cut out.

This eliminates the heavy rush of current which may occur at switching from star to delta the power factor during this interval also being improved.

My switch is specially suitable for use with the special types of squirrel cage motor now being manufactured, namely "high starting torque" squirrel cage motors and will in many cases make it possible to avoid the use of the less robust and efficient slip ring motors.

A leading feature of my invention is therefore the use of resistances in conjunction with star delta switching.

Another leading feature of my invention is the mode of switching hereinafter described which is necessary to give effect to the features above set forth whatever may be the mechanical means employed.

My invention consists in these features and in the features and combinations and arrangements of parts hereinafter described with reference to the accompanying drawings and claimed.

These drawings illustrate a constructional embodiment of the idea or principle underlying my invention, wherein the switching is effected by a starter of a drum controller type.

In these drawings Figure 1 is a sectional elevation of my apparatus, Figure 2 is a sectional plan view on line A—B of Figure 1, Figure 3 is a sectional elevation on line C—D of Figure 2, Figure 4 is a plan view of one of the contact fingers, Figure 5 is a wiring diagram of the starter with the contact plates of the drum shown flat to indicate how they approach the contact fingers when starting up a motor.

According to this invention there is a top plate 1 provided with a back plate 2, a bottom resistance supporting ring 3 and a bottom bearing 4. The top cover 1 is also provided with a wire outlet box 5, two stops 6 and 7 and a central bearing 8. Between the bottom bearing 4 and the top central bearing 8 there is revolvably mounted a hollow cylindrical drum 9 of insulating material, which has fastened thereto top and bottom journal castings 10 and 11 adapted to fit the said bearings 8 and 4 with the top journal casting 10 passing out at the top cover 1 and having a handwheel 12 attached thereto which is provided with a stop 13 arranged to limit the rotation of the hand wheel 12 to between top plate 1 stops 6 and 7. Suitably mounted on the drum 9 there are large contact plates 14, 15, and 16 in one vertical row, and medium contact plates 17, 18 and 19 and small contact plates 20, 21 and 22 in another vertical row, the latter plates being connected together by a wire 23 within the drum 9. The back plate 2 has a rectangular hole 24 into which is placed a panel 25 of suitable insulating material, the panel 25 being attached by hinges 26 and 27 and kept from swinging on the said hinges (except when desired) by a simple catch 28.

Mounted on the panel 25 there are three sets of contact fingers the upper set 29, 30, 31, 32 and 33 situated so that they make contact as desired with drum contact plates 14, 17, and 20; the middle set 34, 35, 36, 37 and 38 situated so as to make contact when desired with drum contact plates 15, 18 and 21 and the lower set 39, 40, 41, 42 and 43 situated to make contact when desired with drum contact plate 16, 19 and 22.

The contact fingers 29 to 43 inclusive are all pivoted on base pieces 44, see Figure 4, so that they can move radially on pivot pins 45 and flat springs 46 mounted between the base pieces 44 and the said fingers keep the latter pressed outwardly so that they make good contact with the drum 9.

Mounted between top cover 1 and the bottom resistance support ring 3 and suitably insulated therefrom there are six resistance units 47, 48, 49, 50, 51 and 52. These resistances are non-inductively wound and supported on non-metallic cores. When used in starting large motors the resistances may be situated in separate containers.

The whole of the mechanism on the under side of the top cover 1 fits into a D shaped tank 53 which is kept filled with suitable oil.

The three windings 54, 55 and 56 represent a three phase and squirrel cage A. C. induction motor or other 3 phase machines started up by A. C. supply, see Figure 5, with ends of windings 57, 58, 59, 60, 61 and 62.

The main power supply is represented by 63, 64, and 65 which are the three phase wires of supply.

Wires connect the following:—
Power supply 63 and finger contact 29.
Power supply 64 and finger contact 34.
Power supply 65 and finger contact 39.
Finger contact 30 and resistance 47 and the opposite end of the latter to finger contact 31 which is also connected to resistance 48 which terminates at finger contact 32, the latter being connected to winding 55 end 61.

Finger contact 35 is connected to resistance 49 the opposite end of which is connected to finger contact 36 which is also connected to resistance 50 which terminates at finger contact 37, the latter being connected to winding 56 end 62.

Finger contact 40 is connected to resistance 51, the opposite end of which is connected to finger contact 41 which is also connected to resistance 52 which terminates at finger contact 42 the latter being connected to winding 54 end 60.

Finger contact 33 is connected to winding 54 end 57.

Finger contact 38 is connected to winding 55 end 58.

Finger contact 43 is connected to winding 56 end 59.

In operation the handwheel 12 is moved in the direction of the arrow shown in Figure 2 so that the drum 9 rotates and the plates 14 to 22 inclusive approach the contact fingers 29 to 43 inclusive as indicated by the arrow of Figure 5.

At the first position of contact, plate 17 touches finger contacts 29 and 30, plate 20 touches contact finger 33, 18 touches 34 and 35, 21 touches 38, 19 touches 39 and 40, and 22 touches 43; the current from current supply line 63 passes from finger 29 through plate 17 to finger 30 and then through resistances 47 and 48 to the winding 55 end 61, likewise current from supply line 64 passes from finger 34 through plate 18 to finger 35 and then through resistances 49 and 50 to winding 56 end 62 and also likewise current from supply line 65 passes from finger 39 through plate 19 to finger 40 and then through resistances 51 and 52 to winding 54 end 60.

Simultaneously the opposite ends 57, 58 and 59 of windings 54, 55 and 56 are connected through fingers 33, 38 and 43 to the small plates 20, 21 and 22 and as the latter are connected together by wire 23 this first point of contact has resulted in the ends 57, 58 and 59 of windings 54, 55 and 56 being connected together, with their opposite ends 60, 61 and 62 connected through resistances to the power lines 65, 63 and 64 and this is a "star" connection of the motor with two sets of resistance to each winding.

At the second position of contact, the plates and fingers touch the same as in position one but in addition plate 17 touches contact 31, plate 18 touches contact 36 and plate 19 also touches contact 41.

The current passes exactly the same as in position one except that instead of passing through finger 30 and resistance 47, likewise finger 35 and resistance 49 and also likewise finger 40 and resistance 51, it takes the direct course through fingers 31, 36 and 41, with the result that the motor is still connected "star" but has now only one resistance to each winding.

At the third position of contact, the plates and fingers touch as in the second position but in addition touch fingers 32, 37 and 42 with the result that current passing through plate 17 eliminates 47 and 48, likewise plate 18 current eliminates resistances 49 and 50 and also likewise current through plate 19 eliminates resistances 51 and 52 and the motor is then connected "star" without any resistance.

At the fourth position of contact the plates 17 to 22 inclusive have passed the first and second vertical row of finger contacts and the large plates 14, 15 and 16 are touching their respective sets of contact fingers 29, 30, 33; 34, 35, 38; and 39, 40, 43.

Current from the supply line 63 passes from finger 29 through plate 14 to fingers 30 and 33 and from finger 30 through resistances 47 and 48 to the winding 55 and 61, also from finger 33 to winding 54 and 57.

Current from supply line 64 passes from finger 34 through plate 15 to fingers 35 and 38 and from finger 35 through resistances 49 and 50 to winding 56 and 62, also from finger 38 to winding 55 and 58.

Current from supply line 65 passes from finger 39 through plate 16 to fingers 40 and 43 and from finger 40 through resistances 51 and 52 to winding 54 and 60 also from finger 43 to winding 56 and 59.

This has resulted in the motor being connected in "delta" with two sets of resistances to each winding.

At the fifth position of contact the plates and fingers touch as in the fourth position but in addition plate 14 touches finger 31, plate 15 touches finger 36 and plate 16 touches finger 41 and this results in the motor being connected in "delta" but with one resistance unit 47, 49 and 51 being cut out of each winding 55, 56 and 54 respectively.

At the sixth position which is also the last where the handwheel 12 is prevented from further rotation by its stop 13 coming up against top plate stop 7, the plates and fingers touch as in the fifth position but in addition plate 14 touches finger 32, plate 15 touches finger 37 and plate 16 touches finger 42 and results in all resistances 47 to 52 inclusive being cut out and the motor running in "delta" without any resistance. It has been found that when starting in "delta", eliminating the "star" connection and using the series resistances, the current at standstill will be about the same as that when using a compensator but the starting period will be very much shorter so that the power consumed for starting will be materially less with equal or better starting torque. With the present type of starter the current rush is not so great as that when using a compensator, for the motor is not disconnected from the line when shifting from starting to running position.

Claims:

1. In combination with a polyphase alternating current motor, a source of current, a starter comprising limiting resistances, and means for connecting the stator windings of said motor in "star" to said source of current supply and simultaneously inserting said limiting resistances in series with each of said windings, removing said resistances from said "star" connection, then connecting the stator windings of said motor in "delta" to said source of current supply and simultaneously inserting said limiting resistances in series with each of said stator windings, and then removing said resistances from said "delta" connection to permit the motor to run in straight "delta".

2. In combination with a polyphase alternating current motor, a source of current, a starter comprising limiting resistances, and means for connecting the stator windings of said motor in "star" to said source of current supply and simultaneously inserting said limiting resistances in series with each of said windings, successively removing portions of said resistances until all of the resistances have been removed from said "star" connection, then connecting the stator windings of said motor in "delta" to said source of current supply and simultaneously inserting said limiting resistances in series with each of said stator windings, and then successively removing portions of said resistances until all of the resistances have been removed from said "delta" connection and the motor is running in straight "delta".

3. In combination with a polyphase alternating current motor, a source of current, a starter comprising limiting resistances, and a switch provided with a plurality of spaced insulated contact members, said contact members being brought into operative position in sequence to connect the stator windings of said motor in "star" to said source of current supply and simultaneously insert said limiting resistances in series with each of said windings, successively remove portions of said resistances until all of the resistances have been removed from said "star" connection, then connect the stator windings of said motor in "delta" to said source of current supply and simultaneously insert said limiting resistances in series with each of said stator windings, and then successively remove portions of said resistances until all of the resistances have been removed from said "delta" connection and the motor is running in straight "delta".

In testimony whereof I affix my signature.

HELIER OSWALD BREE.